(12) United States Patent
Kim et al.

(10) Patent No.: US 11,128,234 B2
(45) Date of Patent: Sep. 21, 2021

(54) SYSTEM FOR SEAMLESS POWER CONVERSION IN DC POWER DISTRIBUTION

(71) Applicant: HYOSUNG HEAVY INDUSTRIES CORPORATION, Seoul (KR)

(72) Inventors: Hyun Jun Kim, Incheon (KR); Yo Han Baek, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 16/967,268

(22) PCT Filed: Dec. 21, 2018

(86) PCT No.: PCT/KR2018/016414
§ 371 (c)(1),
(2) Date: Aug. 4, 2020

(87) PCT Pub. No.: WO2019/156346
PCT Pub. Date: Aug. 15, 2019

(65) Prior Publication Data
US 2021/0083595 A1     Mar. 18, 2021

(30) Foreign Application Priority Data
Feb. 7, 2018    (KR) .......................... 10-2018-0015243

(51) Int. Cl.
*H02J 7/00*      (2006.01)
*H02M 7/23*      (2006.01)
(Continued)

(52) U.S. Cl.
CPC .............. *H02M 7/23* (2013.01); *H02J 1/102* (2013.01); *H02M 7/44* (2013.01)

(58) Field of Classification Search
CPC .. H02J 9/06; H02J 1/102; H02M 7/44; H02M 1/325; H02M 7/81; H02M 7/23; H02M 7/493
See application file for complete search history.

(56) References Cited

U.S. PATENT DOCUMENTS

| | | | |
|---|---|---|---|
| 2005/0043859 A1* | 2/2005 | Tsai ........................ | H02J 9/062 700/286 |
| 2014/0159497 A1* | 6/2014 | Chen ....................... | H02M 1/32 307/82 |

(Continued)

FOREIGN PATENT DOCUMENTS

| | | |
|---|---|---|
| JP | 06-327147 A | 11/1994 |
| JP | 2007-228666 A | 9/2007 |

(Continued)

*Primary Examiner* — Jared Fureman
*Assistant Examiner* — Esayas G Yeshaw
(74) *Attorney, Agent, or Firm* — Novick, Kim & Lee, PLLC; Jae Youn Kim (57) ABSTRACT

Provided is a system for seamless power conversion in DC power distribution, the system including power conversion devices connected in parallel, and performing conversion from a AC voltage to a DC voltage between an AC power distribution network and a DC power distribution network, wherein a master power conversion device among the power conversion devices converts the AC voltage supplied from the AC power distribution network into the DC voltage including an AC voltage at a preset level, and supplies the DC voltage to a DC power distribution line of the DC power distribution network, and the remaining power conversion devices that are slave power conversion devices detect the DC voltage at the DC power distribution line in real time, and when the AC voltage is not sensed from the detected DC voltage, one of the slave power conversion devices is converted into a master power conversion device.

9 Claims, 6 Drawing Sheets

(51) Int. Cl.
  *H02J 1/10*   (2006.01)
  *H02M 7/44*   (2006.01)

(56) References Cited

U.S. PATENT DOCUMENTS

| | | | |
|---|---|---|---|
| 2015/0372487 A1* | 12/2015 | Abe | G05B 15/02 |
| | | | 700/295 |
| 2016/0096437 A1* | 4/2016 | Tripathi | H02J 7/00 |
| | | | 307/31 |
| 2017/0229972 A1* | 8/2017 | Cerqueira Pinto Bezerra | |
| | | Varaj O | H02M 7/797 |
| 2018/0331568 A1* | 11/2018 | Toyoda | H02J 3/38 |

FOREIGN PATENT DOCUMENTS

| | | |
|---|---|---|
| JP | 2015-006014 A | 1/2015 |
| KR | 10-2012-0005801 A | 1/2012 |
| KR | 10-1650010 B1 | 9/2016 |

* cited by examiner

SYSTEM FOR SEAMLESS POWER CONVERSION IN DC POWER DISTRIBUTION

TECHNICAL FIELD

The present disclosure relates to seamless power conversion in DC power distribution. More particularly, the present disclosure relates to a system for seamless power conversion in DC power distribution, wherein when a fault occurs in a master power conversion device in DC power distribution, a slave power conversion device is converted into a master power conversion device quickly, thereby performing control of voltage in a seamless manner.

BACKGROUND ART

In order to supply DC power to various facilities through a DC power distribution line, a power conversion device is required to convert AC power supplied from an AC power distribution network, to DC power. It is technically difficult to manufacture a single power conversion device having a large capacity, and it is reasonable to connect multiple power conversion devices having small capacities, in parallel according to DC power capacity.

In the case of grid-connected power conversion devices operate in parallel using a master-slave method in DC power distribution, it is common in the industry that control of the voltage of a DC power distribution network is performed by a master device and control of the current is performed by multiple slave devices.

Figure 1:
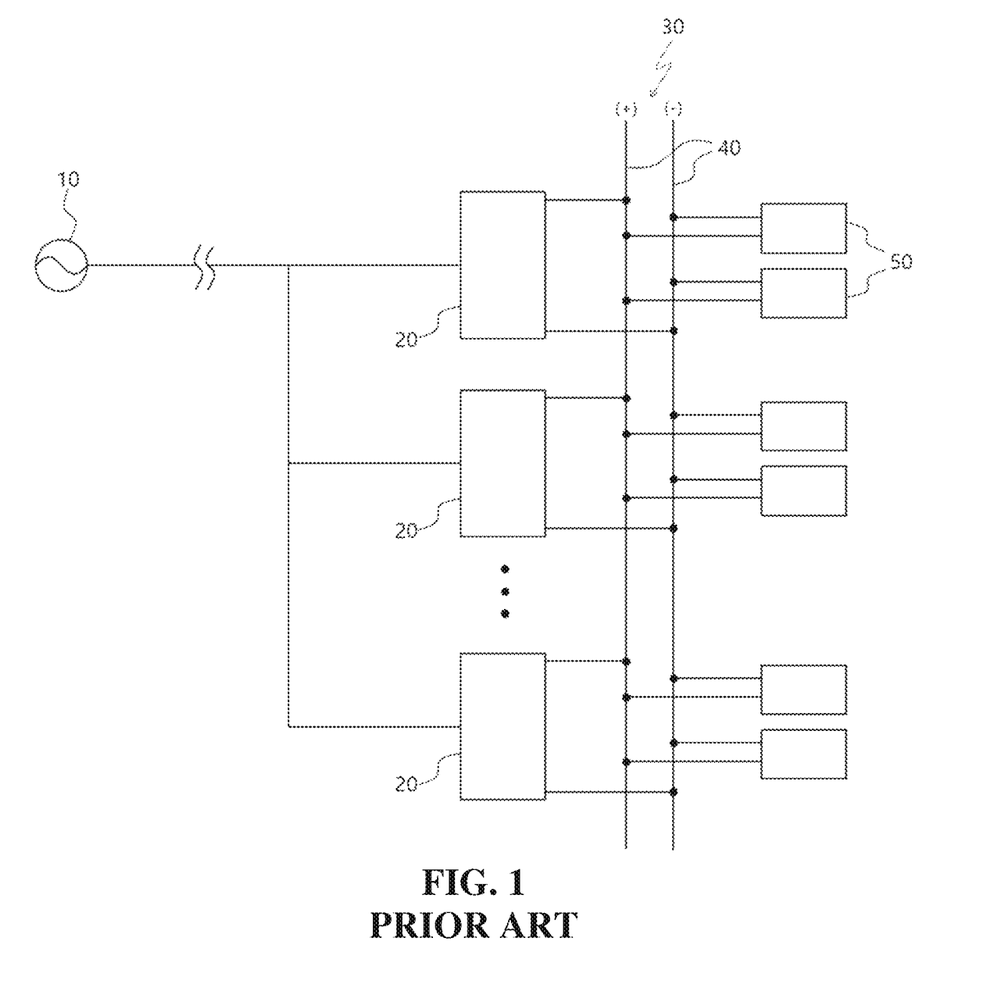
FIG. 1 is a diagram showing a configuration of a system for power conversion in general DC power distribution in the related art.

A system for power conversion in general DC power distribution is shown in FIG. 1. AC power supplied from an AC power distribution network 10 is converted to DC power by multiple power conversion devices 20, and the DC power is supplied to various facilities 50 through a DC power distribution line 40 of a DC power distribution network 30.

Herein, one of the multiple power conversion devices 20 operates as a master power conversion device 20 and performs control of the voltage of the DC power distribution network 30. The remaining power conversion devices operate as slave power conversion devices 20 and perform control of the current of the DC power distribution network 30. To this end, the master power conversion device 20 supplies a DC voltage to the DC power distribution line 40.

As described above, in the case of the master-slave method, dependence on the master power conversion device 20 is large. Therefore, when an accident occurs in the DC power distribution network 30, it is impossible to control the voltage of the DC power distribution network 30. Thus, the entire DC power distribution network 30 causes a power failure.

Figure 2:
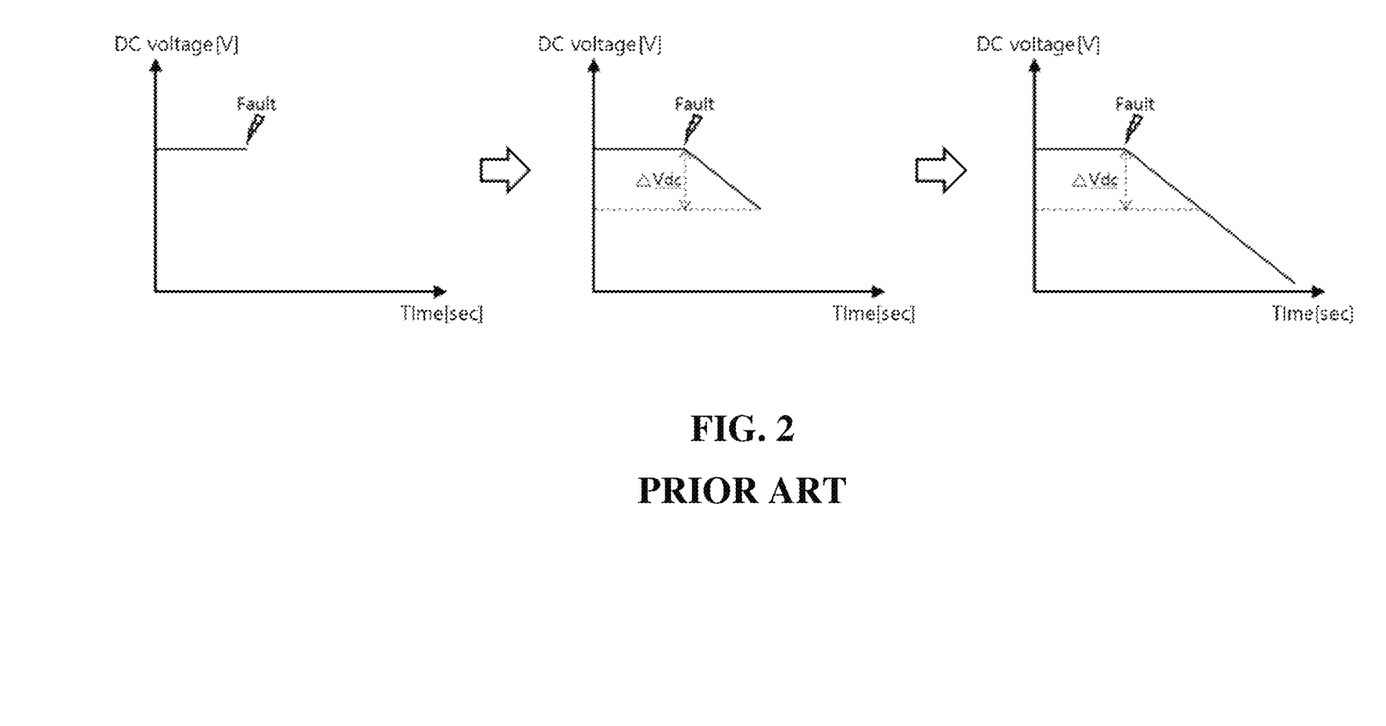
FIG. 2 is a graph showing a DC voltage when a fault occurs while a master power conversion device is in operation, in a system for power conversion in DC power distribution in the related art.
Figure 3:
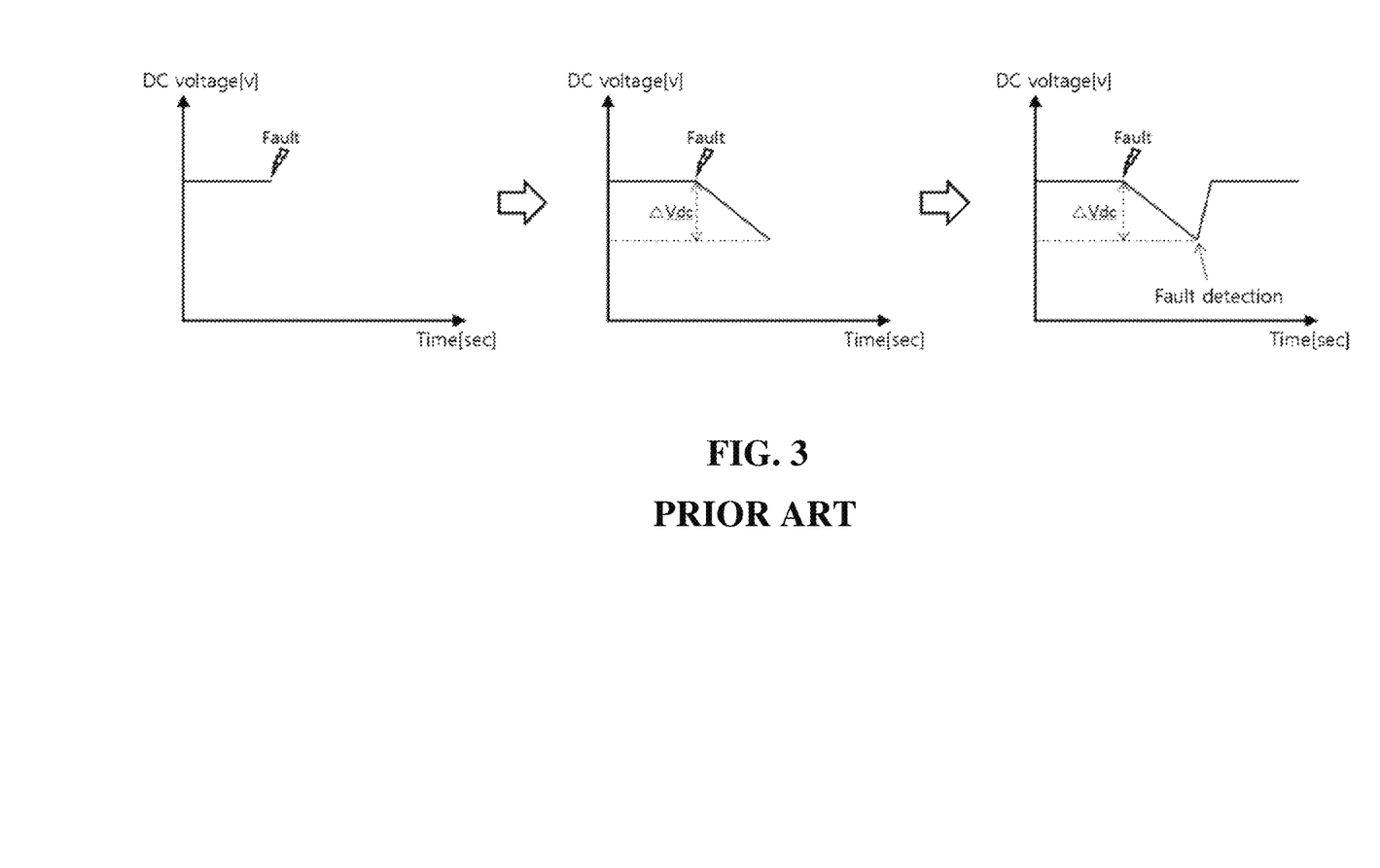
FIG. 3 is a graph showing a time of conversion of a slave power conversion device in response to determination of a fault, in a system for power conversion in DC power distribution in the related art.

When a fault occurs in the master power conversion device 20, the DC voltage gradually decreases from the time of the occurrence of a fault as shown in FIG. 2. Herein, a high-level controller detects the fault when the DC voltage of the DC power distribution line 40 falls to a preset range ($\Delta Vdc$) or below as shown in FIG. 3, and converts one of the multiple slave power conversion devices 20 into a master power conversion device, so that the master power conversion device continues performing control of the voltage of the DC power distribution network 30.

However, in the related art, the occurrence of a fault is determined from the reduction in the DC voltage at the DC power distribution line 40 which is caused by the occurrence of the fault in the master power conversion device 20. Thus, there are problems that it takes a long time to perform the conversion and that seamless transfer in DC power distribution is not achieved.

In particular, the DC voltage supplied to the DC power distribution network 30 has a predetermined range of margin according to the characteristics of the supply of the AC power. Thus, the occurrence of a fault is not determined when the DC voltage is within an error range (for example, about ±10%). As shown in FIG. 3, when the DC voltage is below the error range ($\Delta Vdc$) of the margin, the occurrence of a fault is determined. That is, there is a problem that the determination of a fault is late.

In addition, the high-level controller receives information of all the power conversion devices 20 and loads 50 by communication so as to perform the determination of a fault, and mode switching. Therefore, the rate of mode switching is determined according to the transmission rate. Due to low communication reliability, there is a problem that a power failure of the DC power distribution network may occur in the worst case.

DISCLOSURE

Technical Problem

The present disclosure has been made keeping in mind the above problems occurring in the related art, and is directed to providing a system for seamless power conversion in DC power distribution, wherein a slave power conversion device immediately detects the occurrence of a fault in a master power conversion device in DC power distribution, so that control of a voltage of a DC power distribution network is performed.

In addition, the present disclosure is directed to providing a system for seamless power conversion in DC power distribution, wherein when a fault occurs in a master power conversion device in DC power distribution, a slave power conversion device immediately supplies a DC voltage to a DC power distribution line, thereby achieving seamless power supply in DC power distribution.

Technical Solution

According to an embodiment of the present disclosure, there is provided a system for seamless power conversion in DC power distribution, the system including multiple power conversion devices connected in parallel, and performing conversion from a AC voltage to a DC voltage between an AC power distribution network and a DC power distribution network, wherein a master power conversion device among the multiple power conversion devices converts the AC voltage supplied from the AC power distribution network into the DC voltage including an AC voltage at a preset level, and supplies the DC voltage to a DC power distribution line of the DC power distribution network, and wherein the remaining power conversion devices that are slave power conversion devices detect the DC voltage at the DC power distribution line in real time, and when the AC voltage is not sensed from the detected DC voltage, one of the slave power conversion devices is converted into a master power conversion device.

In the present disclosure, each of the power conversion devices may include: a switching unit with a bridge structure composed of multiple semiconductor switches and capacitors; and a DC voltage control unit controlling switching of the multiple semiconductor switches, wherein the DC voltage control unit generates the DC voltage including the AC voltage by controlling switching of each of the multiple semiconductor switches, when an operation signal for operation as a master power conversion device is received from a high-level controller, and the DC voltage control unit may supply the DC voltage including the AC voltage to the DC power distribution line of the DC power distribution network.

In the present disclosure, each of the power conversion devices may include: a switching unit with a bridge structure composed of multiple semiconductor switches and capacitors; a DC voltage control unit controlling switching of the multiple semiconductor switches; a DC voltage detection unit detecting the DC voltage at the DC power distribution line; and an AC voltage extraction unit extracting the AC voltage from the detected DC voltage, wherein when the AC voltage is extracted from the DC voltage by the AC voltage extraction unit, the power conversion device operates as a slave power conversion device.

In the present disclosure, when the AC voltage is not extracted from the DC voltage by the AC voltage extraction unit, conversion from the slave power conversion device into a master power conversion device takes place.

In the present disclosure, the level of the AC voltage may be 0.3 to 0.7% of a level of the DC voltage.

In addition, according to another embodiment of the present disclosure, there is provided a system for seamless power conversion in DC power distribution in which a master and a slave power conversion device operate in parallel, wherein the master power conversion device converts an AC voltage supplied from an AC power distribution network into a DC voltage including an preset AC voltage at a preset level, and supplies the DC voltage to a DC power distribution line of a DC power distribution network, and wherein the slave power conversion device detects the DC voltage at the DC power distribution line in real time, and keeps operating as the slave power conversion device when the AC voltage is sensed from the DC voltage, and is converted into a master power conversion device when the AC voltage is not sensed.

In the present disclosure, the master power conversion device may perform control of a voltage of the DC power distribution network, and the slave power conversion device may perform control of a current of the DC power distribution network.

In the present disclosure, the master power conversion device may include: a switching unit with a bridge structure composed of multiple semiconductor switches and capacitors; and a DC voltage control unit controlling switching of the multiple semiconductor switches, wherein the DC voltage control unit generates the DC voltage including the AC voltage by controlling switching of each of the multiple semiconductor switches, when an operation signal for operation as a master power conversion device is received from a high-level controller, and the DC voltage control unit supplies the DC voltage including the AC voltage to the DC power distribution line of the DC power distribution network.

In the present disclosure, the slave power conversion device may include: a switching unit with a bridge structure composed of multiple semiconductor switches and capacitors; a DC voltage control unit controlling switching of the multiple semiconductor switches; a DC voltage detection unit detecting the DC voltage at the DC power distribution line; and an AC voltage extraction unit extracting the AC voltage from the detected DC voltage, wherein when the AC voltage is extracted from the DC voltage by the AC voltage extraction unit, the slave power conversion device keeps operating as the slave power conversion device, and when the AC voltage is not sensed, the slave power conversion device is converted into a master power conversion device.

Advantageous Effects

According to the present disclosure, conversion between the master power conversion device and the slave power conversion device is performed at a rapid reaction rate in DC power distribution, so that seamless power supply is achieved in the DC power distribution line.

In addition, according to the present disclosure, the master power conversion device performs control of the DC voltage in the DC power distribution network by including a fine AC voltage command value in a DC voltage output value, and the slave power conversion device determines that a fault occurs in the master power conversion device, when the AC voltage is not sensed, and the slave power conversion device is converted into a master power conversion device, whereby seamless transfer between the master and the slave is achieved with low cost and a simple method.

DESCRIPTION OF DRAWINGS

FIGS. 7($a$)-7($b$) are graphs showing results of experiments on power conversion between a system for power conversion in DC power distribution in the related art, and a system for power conversion in DC power distribution according to the present disclosure.

BEST MODE

Hereinafter, embodiments of the present disclosure will be described in detail with reference to the exemplary drawings. In inserting reference numerals to the elements in each drawing, although the same elements are illustrated in different drawings, they are designated by the same reference numeral as far as possible. Further, in describing the embodiments of the present disclosure, if it is decided that the detailed description of known configuration or function related to the disclosure makes the subject matter of the disclosure unclear, the detailed description is omitted.

Additionally, in describing the elements of the present disclosure, terms such as first, second, A, B, (a), and (b) may be used. The terms are only for differentiating one element from the other and not to imply or suggest the substances, order or sequence of the elements. If an element is described as being "connected", "coupled", or "linked" to another element, they may mean the elements are not only directly "connected", "coupled", or "linked" but also are indirectly "connected", "coupled", or "linked" via one or more additional elements interposed therebetween.

Figure 4:
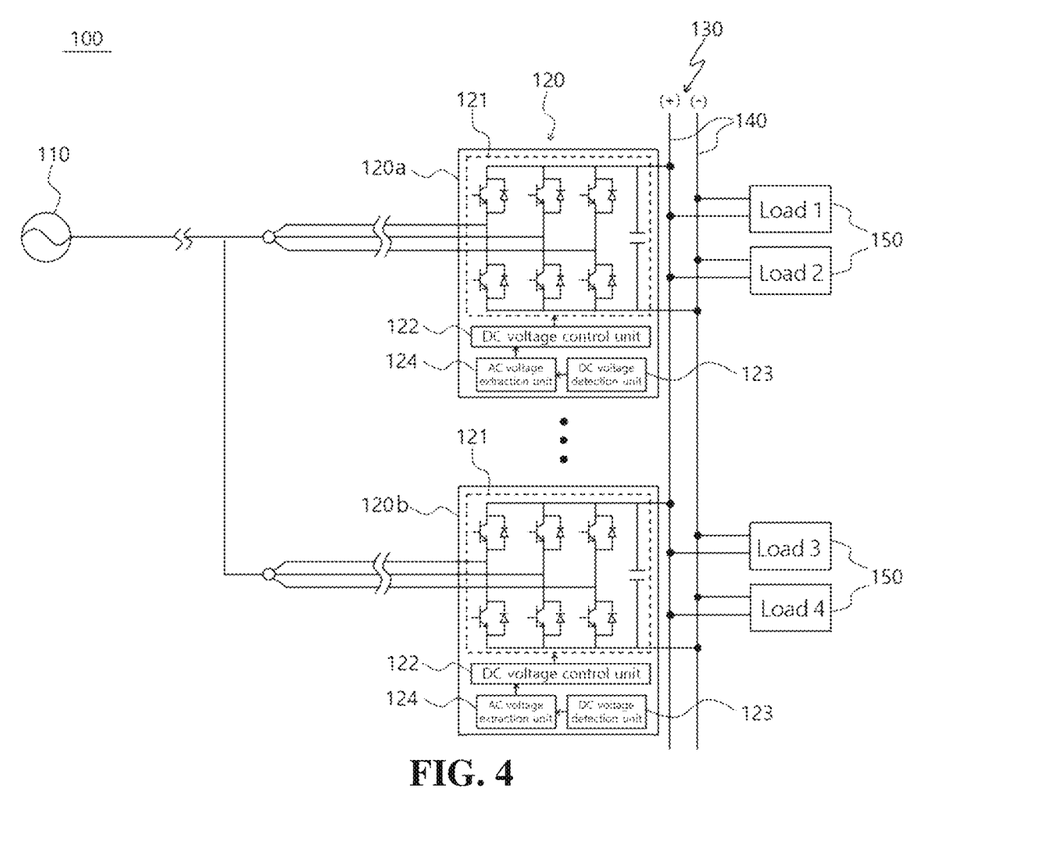
FIG. 4 is a diagram showing a configuration of a system for power conversion in DC power distribution according to an embodiment of the present disclosure.

FIG. 4 is a diagram showing a configuration of a system for power conversion in DC power distribution according to an embodiment of the present disclosure.

Referring to FIG. 4, according to an embodiment of the present disclosure, a system 100 for seamless power conversion in DC power distribution is connected between an AC power distribution network 110 and a DC power distribution network 130, converts an AC voltage supplied from the AC power distribution network 110 to a DC voltage for use in the DC power distribution network 130, and supplies the DC voltage to the DC power distribution network 130 through a DC power distribution line 140.

At least two or more power conversion devices 120 are connected to each other in parallel. The number of the power conversion devices 120 may be determined according to the amount of DC power required by the DC power distribution network 130. As the DC voltage (the amount of power) required by the DC power distribution network 130 increases, the conversion capacities of the power conversion devices 120 increase.

Recently, there have been attempts to manufacture a power conversion device having a large capacity. However, preferably, power conversion devices having relatively small capacities are used by being connected in parallel. In this embodiment, such power conversion devices may be inverters or converters.

The multiple power conversion devices 120 include: a master power conversion device 120a performing control of the voltage of the DC power distribution network 130; and the remaining power conversion device that is a slave power conversion device 120b performing control of the power of the DC power distribution network 130, that is, control of the current thereof.

In order to configure one master power conversion device 120a, and one or more slave power conversion devices 120b which are the remaining power conversion devices as described above, a high-level controller (not shown) selects any one of the multiple power conversion devices 120, sets the selected one to operate as the master power conversion device 120a, and sets the others to operate as the slave power conversion devices 120b.

Herein, an important feature in this embodiment is that the power conversion device which is set as the master power conversion device 120a by the high-level controller (not shown) converts the AC voltage supplied from the AC power distribution network 110 into the DC voltage including an AC voltage at a preset level, and supplies the DC voltage to the DC power distribution line 140 of the DC power distribution network 130.

That is, differently from the related art, in this embodiment, when the master power conversion device 120a performing control of the voltage of the DC power distribution network 130 supplies the DC voltage to the DC power distribution network 130, the supplied DC voltage includes a small amount of AC voltage. This means that in practice, the DC voltage has as much change in level as there is a range corresponding to the amplitude of the AC voltage.

It is noted that the change in the DC voltage caused by such an AC voltage has a negligible influence on the DC power distribution network 130.

Herein, each of the one or more slave power conversion devices 120b detects the DC voltage of the DC power distribution line 140 in real time, and identifies whether the AC voltage is sensed from the detected DC voltage. Herein, the AC voltage to be sensed is a voltage supplied by the master power conversion device 120a.

When the AC voltage is sensed from the DC voltage of the DC power distribution line 140, each of the slave power conversion devices 120b keeps operating as the slave power conversion device 120b. Conversely, when the AC voltage is not sensed, it is determined that a fault occurs in the master power conversion device 120a and one of the slave power conversion devices 120b is converted into a master power conversion device 120a and operates as the master power conversion device 120a. Consequently, the control of the voltage of the DC power distribution network 130 is continuously performed.

Since the master power conversion device 120a supplies the DC voltage including the AC voltage to the DC power distribution line 140 as described above, when the master power conversion device 120a operates normally, the slave power conversion devices 120b extract the AC voltage from the DC voltage detected at the DC power distribution line 140.

However, when a fault occurs in the master power conversion device 120a, the AC voltage is not included in the DC voltage supplied to the DC power distribution line 140, so the AC voltage is not sensed by the slave power conversion devices 120b from the DC voltage detected at the DC power distribution line 140. Therefore, it is immediately determined that a fault occurs in the master power conversion device 120a.

As described above, in the present disclosure, the slave power conversion devices 120b do not detect the occurrence of a fault in the master power conversion device 120a by using the level of the DC voltage reduced at the DC power distribution line 140 due to the occurrence of the fault in the master power conversion device 120a, but the occurrence of the fault in the master power conversion device 120a is detected by identifying whether the AC voltage is sensed from the DC voltage. Therefore, the slave power conversion devices 120b are capable of detecting the occurrence of the fault in the master power conversion device 120a within a short time.

Accordingly, the rate at which the slave power conversion device 120b is converted into the master power conversion device 120a is increased, so that seamless power supply in DC power distribution is achieved.

Referring to the figure, each of the power conversion devices 120 includes: a switching unit 121 with a bridge structure composed of multiple semiconductor switches and capacitors; and a DC voltage control unit 122 controlling switching of the multiple semiconductor switches. The DC voltage control unit 122 converts the input AC voltage into the DC voltage by turning on and turning off the semiconductor switches according to a set process, and stores the DC voltage in the capacitors.

In particular, in this embodiment, when an operation signal for operation as a master power conversion device 120a is received from the high-level controller, the DC voltage control unit 122 converts the input AC voltage into the DC voltage by controlling switching of each of the semiconductor switches of the bridge structure, wherein the DC voltage includes a preset AC voltage. The AC voltage may be generated by adjusting the turn-on/turn-off time of the semiconductor switches by the DC voltage control unit 122.

The DC voltage including the AC voltage is supplied to the DC power distribution line 140, whereby the DC voltage is consumed by various types of loads 150 connected to the DC power distribution line 140.

In addition, each of the power conversion devices 120 further includes: a DC voltage detection unit 123 detecting the DC voltage at the DC power distribution line 120; and an AC voltage extraction unit 124 extracting the AC voltage from the detected DC voltage. It is preferable that the DC voltage detection unit 123 and the AC voltage extraction unit 124 operate when the power conversion device 120 operates as a slave power conversion device 120*b*. That is, when the master power conversion device 120*a* supplies the DC voltage including the AC voltage to the DC power distribution line 140, the DC voltage detection unit 123 of the slave power conversion device 120*b* senses the DC voltage at the DC power distribution line 140. Herein, the AC voltage extraction unit 124 extracts the AC voltage from the sensed DC voltage so as to identify whether the DC voltage includes the AC voltage.

When the AC voltage is included, it is determined that the master power conversion device 120*a* operates normally, and the slave power conversion device 120*b* keeps operating as the slave power conversion device 120*b*. Conversely, when the AC voltage is not included, it is determined that a fault occurs in the master power conversion device 120*a*, and the slave power conversion device 120*b* is converted into a master power conversion device.

In the case of multiple slave power conversion devices, any one selected thereamong may be converted into a master power conversion device. For example, among the multiple slave power conversion devices, the slave power conversion device that detects the fault in the master power conversion device most quickly may be converted into a master power conversion device.

In this embodiment, the AC voltage included in the DC voltage supplied to the DC power distribution network 130 is required not to influence the DC voltage of the DC power distribution network 130. Therefore, the level of the AC voltage is very low. For example, it is preferable that the level of the AC voltage is less than 1% of the level of the DC voltage. More preferably, the level of the AC voltage is 0.3 to 0.7% of the level of the DC voltage. The level and the ratio of the AC voltage may be changed according to the capacity and the level of the DC voltage required by the DC power distribution network.

Figure 5:
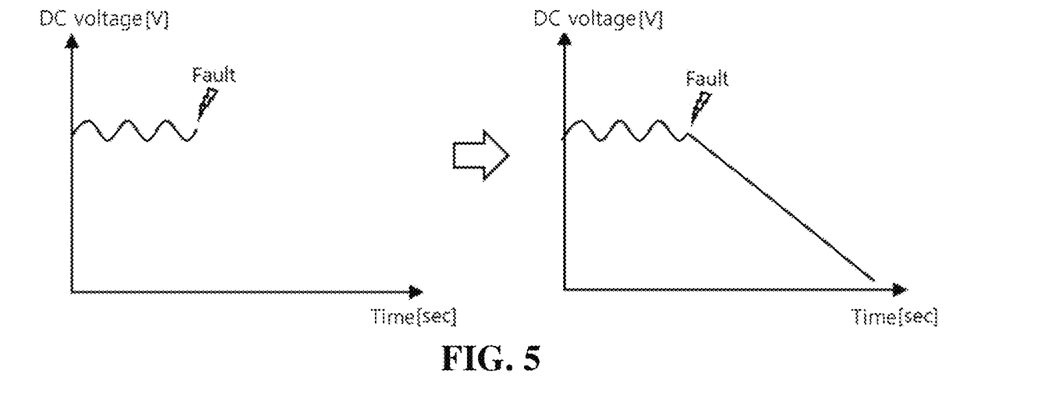
FIG. 5 is a graph showing a DC voltage when a fault occurs while a master power conversion device is in operation, in a system for power conversion in DC power distribution according to an embodiment of the present disclosure.
Figure 6:
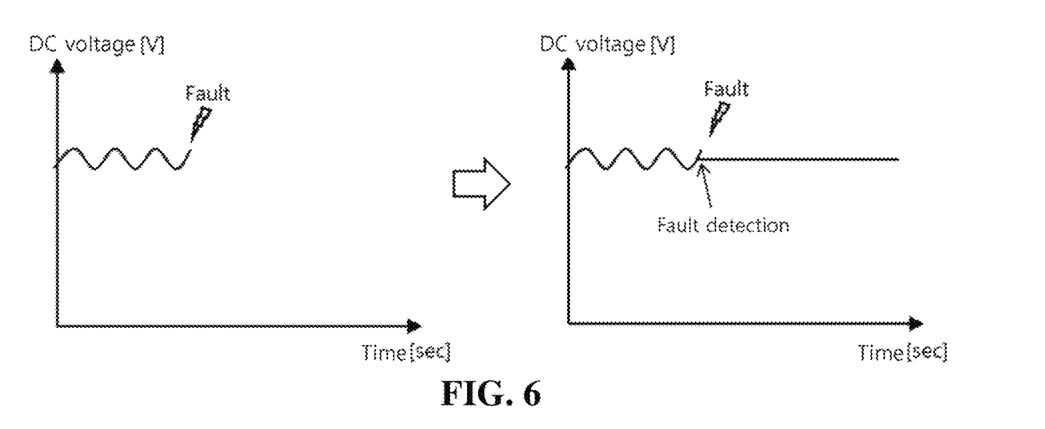
FIG. 6 is a graph showing a time of conversion of a slave power conversion device in response to determination of a fault, in a system for power conversion in DC power distribution according to an embodiment of the present disclosure.

FIG. 5 is a graph showing a DC voltage when a fault occurs while a master power conversion device is in operation, in a system for power conversion in DC power distribution according to an embodiment of the present disclosure. FIG. 6 is a graph showing a time of conversion of a slave power conversion device in response to determination of a fault, in a system for power conversion in DC power distribution according to an embodiment of the present disclosure.

First, FIG. 5 shows a DC voltage that the master power conversion device 120*a* supplies to the DC power distribution line 140, specifically, a DC voltage including an AC voltage. In FIG. 5, for convenience of description, the DC voltage is shown, but the DC voltage including the AC voltage is supplied in practice.

While the master power conversion device 120*a* operates normally and the DC voltage including the AC voltage is supplied to the DC power distribution line 140, when a fault occurs due to some reason, the DC voltage at the DC power distribution line 140 continuously decreases.

In response to this process, as shown in FIG. 6, the slave power conversion device 120*b* senses the DC voltage at the DC power distribution line 140 in real time. When the master power conversion device 120*a* operates normally, the DC voltage detected at the DC power distribution line 140 includes the AC voltage, so a voltage signal as shown in FIG. 6 is sensed.

When a fault occurs in the master power conversion device 120*a*, the AC voltage is not sensed from the DC voltage at the DC power distribution line 140. Immediately after identifying this, the slave power conversion device 120*b* detects the fault in the master power conversion device 120*a* and is converted into a master power conversion device 120*a*. Accordingly, in the present disclosure, as soon as the AC voltage is not sensed, master-slave conversion is performed, so that a rapid conversion rate is acquired, thereby achieving seamless power supply to the DC power distribution line 140.

Figure 7A:
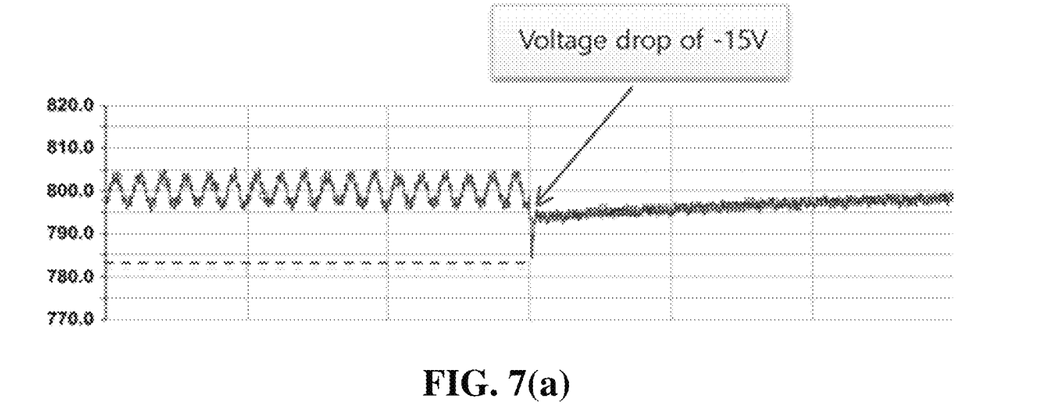
Figure 7B:
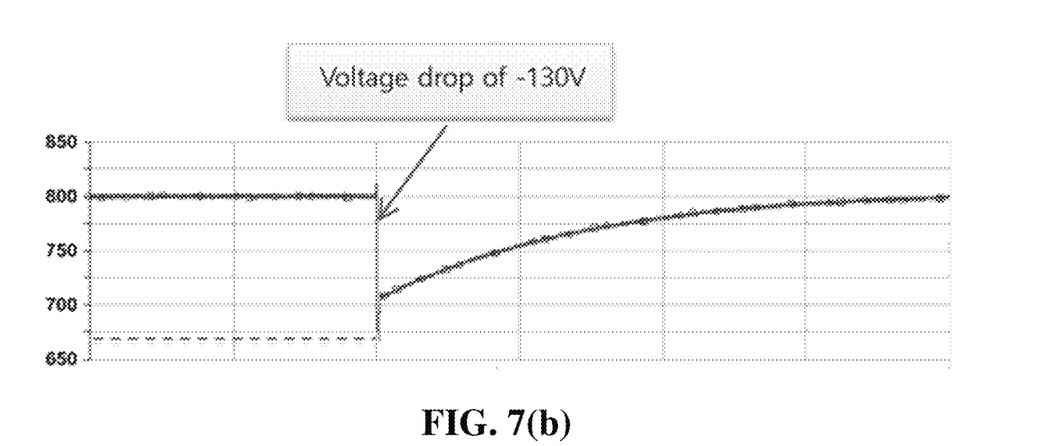

FIGS. 7(*a*)-7(*b*) are graphs showing results of experiments on seamless power conversion between a system for power conversion in DC power distribution in the related art, and a system for power conversion in DC power distribution according to the present disclosure.

In FIG. 7(*b*), in the related art, since the slave power conversion device 120*b* detects the occurrence of a fault in the master power conversion device 120*a* when the DC voltage of the DC power distribution line 140 falls to a predetermined range or below, it is found that a voltage drop of −130 V occurs, and it takes a considerable time to secure a stable DC voltage.

Conversely, in FIG. 7(*a*), since the slave power conversion device 120*b* of the present disclosure detects the AC voltage from the DC voltage of the DC power distribution line 140 in real time, and detects the occurrence of a fault in the master power conversion device 120*a* as soon as the AC voltage is not detected, it is found that only a voltage drop of −15 V occurs, and a stable DC voltage is secured immediately.

As described above, in the system for seamless power conversion in DC power distribution according to the present disclosure, the slave power conversion device determines a fault in the master power conversion device as soon as the AC voltage is not detected from the DC voltage sensed at the DC power distribution line, and the slave power conversion device is converted into a master power conversion device, whereby seamless power supply in DC power distribution is achieved.

Although all elements constituting an embodiment of the present disclosure are described as being combined into a single element or as being operated in combination, the present disclosure is not limited to those embodiments. That is, within the scope of the present disclosure, one or more of all elements may be selectively combined and operated. Further, unless specifically stated otherwise, it should be understood that terms such as "include", "consist" or "have" are merely intended to indicate the inclusion of stated elements but not the exclusion of any other elements. Unless differently defined, all terms used here including technical or scientific terms have the same meanings as the terms generally understood by those skilled in the art to which the present disclosure pertains. Generally used terms, such as terms defined in dictionaries, should be interpreted as having meanings consistent with the contextual meanings of the related art, and are not interpreted as being ideal or excessively formal meanings, unless explicitly defined in the present specification.

The above description is merely illustrative of the technical spirit of the present disclosure, and those skilled in the art to which the present disclosure pertains will appreciate that various changes and modifications are possible without departing from the essential features of the present disclosure. Therefore, the embodiments disclosed in the present disclosure are not intended to limit the technical spirit of the present disclosure and are merely intended to describe the present disclosure, and the scope of the present disclosure is not limited by those embodiments. The protection scope of the present disclosure should be defined by the accompanying claims, and the technical spirit of all equivalents thereof should be construed as being included in the scope of the present disclosure.

The invention claimed is:

1. A system for power conversion, the system comprising multiple power conversion devices connected in parallel, and performing conversion from an AC voltage to a DC voltage between an AC power distribution network and a DC power distribution network,
   wherein a first master power conversion device among the multiple power conversion devices converts the AC voltage supplied from the AC power distribution network into the DC voltage including an AC voltage at a preset level, and supplies the DC voltage to a DC power distribution line of the DC power distribution network, and
   wherein the remaining power conversion devices that are slave power conversion devices detect the DC voltage at the DC power distribution line in real time, and when the preset AC voltage is not sensed from the detected DC voltage, one of the slave power conversion devices is converted into a second master power conversion device.

2. The system of claim 1, wherein each of the power conversion devices comprises:
   a switching unit with a bridge structure composed of multiple semiconductor switches and capacitors; and
   a DC voltage control unit controlling switching of the multiple semiconductor switches,
   wherein the DC voltage control unit generates the DC voltage including the preset AC voltage by controlling switching of each of the multiple semiconductor switches, when an operation signal for operation as the first master power conversion device is received from a high-level controller, and the DC voltage control unit supplies the DC voltage including the preset AC voltage to the DC power distribution line of the DC power distribution network.

3. The system of claim 1, wherein each of the power conversion devices comprises:
   a switching unit with a bridge structure composed of multiple semiconductor switches and capacitors;
   a DC voltage control unit controlling switching of the multiple semiconductor switches;
   a DC voltage detection unit detecting the DC voltage at the DC power distribution line; and
   an AC voltage extraction unit extracting the preset AC voltage from the detected DC voltage,
   wherein when the preset AC voltage is extracted from the DC voltage by the AC voltage extraction unit, the second master power conversion device operates as a slave power conversion device.

4. The system of claim 3, wherein when the preset AC voltage is not extracted from the DC voltage by the AC voltage extraction unit, conversion from the slave power conversion device into the second master power conversion device takes place.

5. The system of claim 1, wherein the level of the preset AC voltage is 0.3 to 0.7% of a level of the DC voltage.

6. A system for seamless power conversion in which a master and a slave power conversion device operate in parallel,
   wherein the master power conversion device converts an AC voltage supplied from an AC power distribution network into a DC voltage including a preset AC voltage at a preset level, and supplies the DC voltage to a DC power distribution line of a DC power distribution network, and
   wherein the slave power conversion device detects the DC voltage at the DC power distribution line in real time, and keeps operating as the slave power conversion device when the preset AC voltage is sensed from the DC voltage, and is converted into a master power conversion device when the AC voltage is not sensed.

7. The system of claim 6, wherein the master power conversion device performs control of a voltage of the DC power distribution network, and the slave power conversion device performs control of a current of the DC power distribution network.

8. The system of claim 6, wherein the master power conversion device comprises:
   a switching unit with a bridge structure composed of multiple semiconductor switches and capacitors; and
   a DC voltage control unit controlling switching of the multiple semiconductor switches,
   wherein the DC voltage control unit generates the DC voltage including the preset AC voltage by controlling switching of each of the multiple semiconductor switches, when an operation signal for operation as the master power conversion device is received from a high-level controller, and the DC voltage control unit supplies the DC voltage including the preset AC voltage to the DC power distribution line of the DC power distribution network.

9. The system of claim 6, wherein the slave power conversion device comprises:
   a switching unit with a bridge structure composed of multiple semiconductor switches and capacitors;
   a DC voltage control unit controlling switching of the multiple semiconductor switches;
   a DC voltage detection unit detecting the DC voltage at the DC power distribution line; and
   an AC voltage extraction unit extracting the preset AC voltage from the detected DC voltage,
   wherein when the preset AC voltage is extracted from the DC voltage by the AC voltage extraction unit, the slave power conversion device keeps operating as the slave power conversion device, and when the AC voltage is not sensed, the slave power conversion device is converted into the master power conversion device.

* * * * *